Oct. 3, 1967　　　　H. A. RASCHKE　　　　3,344,489
SAFETY GATE FOR HOOK
Filed Nov. 26, 1965

INVENTOR.
HERBERT A. RASCHKE
BY
Townsend and Townsend
ATTORNEYS

United States Patent Office 3,344,489
Patented Oct. 3, 1967

3,344,489
SAFETY GATE FOR HOOK
Herbert A. Raschke, Greenbrae, Calif., assignor to E. D. Bullard Company, Sausalito, Calif.
Filed Nov. 26, 1965, Ser. No. 509,768
4 Claims. (Cl. 24—241)

This invention relates to a safety gate for a hook which gate prevents inadvertent dislodgement of the load from the hook.

The specific embodiment of this invention described in more detail hereinafter includes a rigid gate body having a length less than the throat of the hook so that when in place in bridging relation of the throat, any force against the gate by a load carried on the hook will tend to wedge the gate more firmly in the throat. The gate of the present invention is mounted to the hook for sliding and pivoting movement so that when removal of the load from the hook is desired the gate can be slid toward the relatively wider basket portion of the hook and freely pivoted clear of the throat. The axis on which the gate is mounted for such sliding and pivoting movement is disposed exterior of the throat so that the gate and the gate mounting structure will not substantially diminish the throat dimension when the gate is in an open position.

An object of the invention is to provide a safety gate that is disposed within the hook throat so that forces tending to disengage the load from the hook will wedge the gate more firmly in a closed position. Appreciation of attainment of this object can be had by comparing prior art structures of the type disclosed in U.S. Patent No. 2,728,967, wherein loads impose a bending force or moment to the gate. A gate capable of resisting such force is necessarily more massive than the gate of the present invention.

Another object of the invention is to provide a safety gate that can be mounted to existing hooks without necessity for special machining operations on the hook. Although the invention described in the aforecited patent is totally satisfactory, it requires that machining operations be performed on the hook shank to receive the gate. The present invention, by way of contrast, includes a clamp for mounting the gate onto the hook without altering the structure or shape of the hook.

Still another object is to provide a safety gate in which the force necessary for opening the gate is applied in a direction toward the gate basket, a direction opposite the direction of the force of a load within the hook.

A further object is to provide a gate which when moved to the open position does not materially diminish or restrict the throat opening of the hook. This object is achieved by mounting the hook for pivotal movement about an axis exterior of the hook throat and providing on the gate body an obliquely extending arm for supporting the hook on the pivotal axis.

These and other objects will be more apparent on referring to the following specification and accompanying drawing in which.

Figure 1:
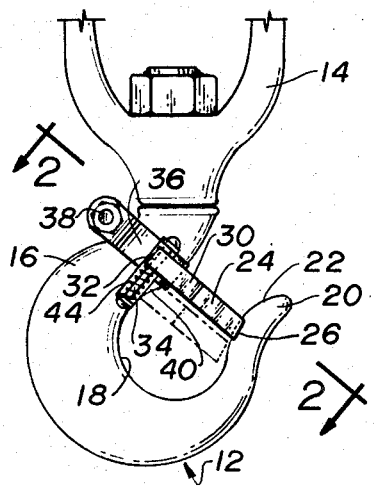
FIG. 1 is a side view of the gate of the present invention in place on a hook.
Figure 3:
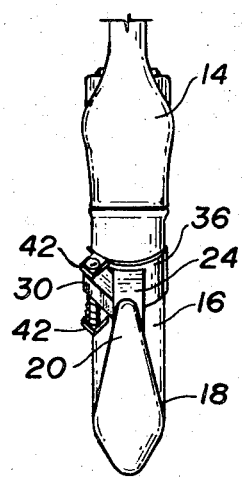
FIG. 3 is a front view of the gate and hook.

Referring more particularly to the drawing, reference numeral 12 generally indicates a hook of the type widely used for engaging and hoisting loads. Such hooks typically include an eye or bail, which is fragmentarily shown at 14, for permitting attachment of the hook to a hoisting line. As is conventional, the hook includes a heel portion 16 which curves outwardly from the eye, a basket portion 18 on which the load is supported, and a tip 20 substantially opposite the heel. The region of minimum distance between tip 20 and heel 16 is typically denominated the throat, a term used in the present specification and claims and designated by reference character 22.

The gate of the present invention includes a gate body 24 having a length greater than the width of throat 22 and being formed at the outer end thereof with a concavity 26 shaped complementary with the surface of tip 20 adjacent throat 22. The opposite end of gate body 24 is concavely radiused at 28 to conform with heel portion 16 of hook 12. As shown in solid lines in FIG. 1 the gate body 24 bridges throat 22 and contacts both heel 16 and tip 22 in such position.

Rigidly attached to gate body 24 and extending obliquely therefrom is a mounting arm 30. As seen more clearly in FIG. 2, arm 30 extends exterior of throat 22 even when the gate body is in bridging position across the throat. The end of arm 30 exterior of the throat is formed with a bore 32 through which extends a shaft 34. Bore 32 and shaft 34 are fitted with respect to one another so that the arm 30 is pivotally and slidably movable with respect to the shaft. Shaft 30 is affixed to hook 12 by means of a band 36 retained in embracing relation to the heel portion of the hook by a threaded fastener 38. Band 36 carries a yoke 40 which includes spaced-apart apertured flanges 42 between which shaft 34 is supported. A compression spring 44 is mounted in circumscribing relation of shaft 34 and biases arm 30 and gate body 24 toward throat 22 and away from hook basket 18.

Figure 2:
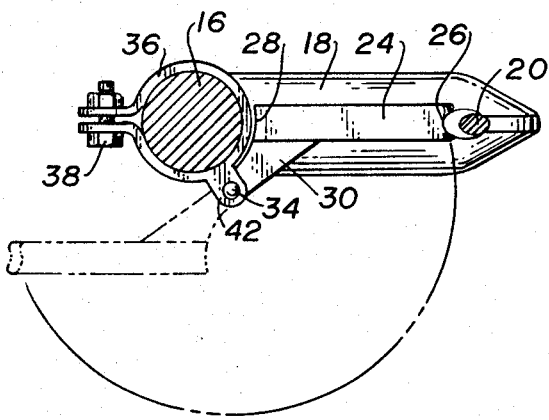
FIG. 2 is an enlarged cross-sectional view of the gate taken substantially along line 2—2 of FIG. 1.

In operation the safety gate of the present invention is mounted onto a hook by passing band 36 around the hook body at heel portion 16. Installation of threaded fastener 38 secures the band in place on the hook. Band 36 is formed of material that is sufficiently bendable or deformable to conform generally with heel portion 16 of the hook. As shown in FIG. 1 the hook body is retained in throat bridging position by spring 44 in such a way that when a load tends to force the gate body outwardly, the gate body is more firmly wedged in the throat by contact between gate ends 26 and 28 with the sides of the throat. When it is desired to open the gate for inserting or removing a load, the gate is pressed in along shaft 34 toward the hook basket against the force of spring 44 to the position shown by broken lines in FIG. 1. At this position the outer end 26 of the gate body is disengaged from tip 20 so that the entire gate can be swung about shaft 34 to the open position shown by broken lines in FIG. 2. As can be seen in FIG. 2 the gate is totally removed from the throat when moved to the open position, and the throat width is diminished only to the extent of the thickness of band 36.

Thus it will be seen that the present invention provides a gate for a safety hook which can be quickly mounted onto a hook without necessity for special machining procedures and which is extremely secure in its retention of a load within the hook basket. Because the gate is opened by movement of the gate body in a direction opposite from the direction of force from a load within the basket, inadvertent disengagement of the gate is virtually eliminated. The present invention additionally provides a gate which in the open position is substantially completely removed from the throat of the hook so as to form no restriction for passage of loads through the throat.

While one embodiment of the invention has been shown and described, it will be apparent that other adaptations and modifications can be made without departing from the true spirit and scope of the invention.

What is claimed is:

1. A safety gate for a hook of the type having a body forming a basket portion and a throat portion of narrower width than the basket portion, said gate comprising an elongate body having a length greater than the width of the throat portion and less than the width of the basket portion, said body having an arm extending laterally therefrom exterior of said throat, means for mounting said arm to said hook for pivotal movement about an axis substantially perpendicular to the throat opening, said arm mounting means being adapted to afford movement of said arm and gate body along said axis to a first position bridging said throat and a second position within said basket, and means for resiliently biasing said arm and gate body to said first position.

2. The invention of claim 1 wherein said arm mounting means comprises a band, means for retaining said band in circumscribing relation on the hook body adjacent said throat portion, a pivot pin mounted on said band coaxial with said axis, said arm defining an aperture on its free end for sliding and pivoting movement on said pin, and a compression spring circumscribing said pin for biasing said arm and gate body toward said first position.

3. A safety gate for a hook of the type having a body extending from a line attaching end in curved form to define a load retaining basket and terminating in a tip opposite the body to define a throat of less width than the width of the basket, said safety gate comprising a rigid gate body having a length somewhat in excess of the width of the throat and less than the width of the basket, said gate body having a first end concaved to conform with the tip of said hook body opposite said throat and a second end remote from said first end, an arm rigidly connected to said gate body adjacent said second end and extending obliquely from said gate body in a direction opposite said first end, means mounted on said hook body adjacent said throat for mounting said arm for pivotal movement relative said hook body, said mounting means including a shaft on which the arm is mounted for pivotal movement and for sliding movement relative said shaft between a throat bridging position and a position within said basket, and means for resiliently biasing said arm longitudinally of said shaft toward the throat bridging position.

4. The invention of claim 3 wherein said gate arm mounting means comprises a clamping band for circumscribing the hook body opposite said throat, a yoke formed on said band exterior of said throat, said shaft being mounted on said yoke exterior of the hook throat.

References Cited

UNITED STATES PATENTS

| | | | |
|---|---|---|---|
| 2,728,967 | 1/1956 | Burnham | 24—241 |
| 2,791,817 | 5/1957 | Burnham | 24—241 |
| 2,853,760 | 9/1958 | Burnham | 24—241 |
| 2,923,045 | 2/1960 | Mount | 24—235 |
| 3,003,214 | 10/1961 | Geraghty | 24—241 |
| 3,121,274 | 2/1964 | Evans | 24—241 |
| 3,121,275 | 2/1964 | Evans | 24—241 |
| 3,121,276 | 2/1964 | Evans | 24—241 |
| 3,139,260 | 6/1964 | Hamel | 24—239 X |

FOREIGN PATENTS 1,014,455   6/1952   France.

WILLIAM FELDMAN, *Primary Examiner.*

D. A. GRIFFIN, *Assistant Examiner.*